United States Patent
Tanaka et al.

(10) Patent No.: US 11,537,035 B2
(45) Date of Patent: Dec. 27, 2022

(54) LIGHT SOURCE APPARATUS AND PROJECTION-TYPE IMAGE DISPLAY APPARATUS

(71) Applicant: Panasonic Intellectual Property Management Co., Ltd., Osaka (JP)

(72) Inventors: Takaaki Tanaka, Osaka (JP); Manabu Okuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/196,142

(22) Filed: Mar. 9, 2021

(65) Prior Publication Data

US 2021/0191243 A1 Jun. 24, 2021

Related U.S. Application Data

(63) Continuation of application No. PCT/JP2019/033504, filed on Aug. 27, 2019.

(30) Foreign Application Priority Data

Sep. 10, 2018 (JP) .............................. JP2018-169064

(51) Int. Cl.
   *G03B 21/20* (2006.01)
   *G03B 21/00* (2006.01)
   *G03B 33/12* (2006.01)

(52) U.S. Cl.
   CPC ....... *G03B 21/2013* (2013.01); *G03B 21/006* (2013.01); *G03B 21/008* (2013.01);
   (Continued)

(58) Field of Classification Search
   CPC .. G03B 21/204; G03B 21/006; G03B 21/008; G03B 21/2013; G03B 21/2066;
   (Continued)

(56) References Cited

U.S. PATENT DOCUMENTS 8,132,919 B2 * 3/2012 Harland ............. G02B 27/0977
353/30
9,977,319 B2 * 5/2018 Ogino .................. G02B 27/106
(Continued)

FOREIGN PATENT DOCUMENTS

JP          7-41583         7/1995
JP       2009-524844        7/2009
(Continued)

OTHER PUBLICATIONS

International Search Report dated Oct. 21, 2019 in International (PCT) Application No. PCT/JP2019/033504.
(Continued)

*Primary Examiner* — Magda Cruz
(74) *Attorney, Agent, or Firm* — Wenderoth, Lind & Ponack, L.L.P.

(57) ABSTRACT

A light source apparatus includes a plurality of light emitting apparatuses. Each of the light emitting apparatuses includes a plurality of light emitting devices each of which has a light emitting area and a non-light emitting area on an emission surface thereof that emits light. At least two light emitting apparatuses of the light emitting apparatuses constitute a light emitting apparatus group disposed such that the emission surfaces of the respective light emitting apparatuses are parallel to each other with a predetermined distance, and that a distance between light emitting areas of the respective light emitting apparatuses when viewed along a direction perpendicular to the emission surfaces of the at least two of the light emitting apparatuses is shorter than a distance between the light emitting areas of the respective light emitting apparatuses when the emission surfaces of the respective light emitting apparatuses are on the same plane.

11 Claims, 9 Drawing Sheets

(52) U.S. Cl.
CPC ....... *G03B 21/204* (2013.01); *G03B 21/2066* (2013.01); *G03B 33/12* (2013.01)

(58) Field of Classification Search
CPC ....... G03B 21/2073; G03B 33/12; F21S 2/00; F21V 9/14; F21V 9/40; H04N 5/74
See application file for complete search history.

(56) References Cited

U.S. PATENT DOCUMENTS

| | | | |
|---|---|---|---|
| 2009/0122272 A1 | 5/2009 | Silverstein et al. | |
| 2009/0213330 A1 | 8/2009 | Silverstein et al. | |
| 2009/0262309 A1* | 10/2009 | Yamauchi | G02B 27/149 |
| | | | 353/37 |
| 2009/0284713 A1* | 11/2009 | Silverstein | H04N 13/337 |
| | | | 353/31 |
| 2010/0149434 A1 | 6/2010 | Desaulniers | |
| 2011/0013144 A1* | 1/2011 | Silverstein | H04N 13/363 |
| | | | 353/8 |
| 2012/0133903 A1* | 5/2012 | Tanaka | G03B 21/2066 |
| | | | 353/31 |
| 2014/0293232 A1* | 10/2014 | Tanaka | G03B 21/2073 |
| | | | 353/31 |
| 2017/0363941 A1* | 12/2017 | Sugiyama | G03B 33/08 |
| 2018/0217484 A1* | 8/2018 | Sugiyama | G03B 21/204 |
| 2018/0217486 A1* | 8/2018 | Tanaka | G03B 21/28 |

FOREIGN PATENT DOCUMENTS

| | | |
|---|---|---|
| JP | 2011-517785 | 6/2011 |
| JP | 2012-133337 | 7/2012 |
| JP | 2012-533767 | 12/2012 |
| JP | 2013-161667 | 8/2013 |
| JP | 2014-209184 | 11/2014 |
| JP | 2017-72788 | 4/2017 |
| JP | 6188132 | 8/2017 |
| JP | 2017-194494 | 10/2017 |

OTHER PUBLICATIONS

English translation of International Preliminary Report on Patentability dated Mar. 25, 2021 in International (PCT) Application No. PCT/JP2019/033504.

\* cited by examiner

LIGHT SOURCE APPARATUS AND PROJECTION-TYPE IMAGE DISPLAY APPARATUS

CROSS REFERENCE TO RELATED APPLICATIONS

The present application is a continuation of PCT/JP2019/033504 filed Aug. 27, 2019, which claims priority to Japanese Patent Application No. 2018-169064, filed Sep. 10, 2018, the entire contents of each of which are incorporated herein by reference.

BACKGROUND

1. Technical Field

The present disclosure relates to a light source apparatus used for, for example, a projection-type image display apparatus and a projection-type image display apparatus including such a light source apparatus.

2. Related Art

Conventionally, there have been disclosed various kinds of light source apparatuses including a long-life solid-state light emitting device such as a light emitting diode or a semiconductor laser device. These light source apparatuses are used as a light source for a projection-type image display apparatus including a light modulation device such as a digital micromirror device (DMD) or a liquid crystal panel.

JP 6188132 B discloses a light emitting apparatus in which a substrate, a plurality of semiconductor laser devices, and a lens array including a plurality of lenses are integrated for miniaturization.

JP 2014-209184 A discloses a small light source apparatus that uses a dichroic mirror and a phase difference plate to separate blue light from a solid-state light source into output light and light for exciting a phosphor according to the polarization.

SUMMARY

A light emitting apparatus as disclosed in JP 6188132 B has a light emitting area and a non-light emitting area on an emission surface thereof that emits light, and not an entire area of the emission surface contributes to light emission. In a case where a plurality of small light emitting apparatuses is arranged to constitute a high-luminance light source apparatus, there may be a problem that a size of the light source apparatus increases due to an increase in a size of total light fluxes by an excess amount of the non-light emitting area. Therefore, it is required to combine light from a plurality of light emitting apparatuses with high efficiency without wasting space.

An object of the present disclosure is to provide a light source apparatus including a plurality of light emitting apparatuses each of which including a substrate, a plurality of light emitting devices, and a plurality of lenses, which are integrated with one another, the light source apparatus being capable of combining light from a plurality of light emitting apparatuses with high efficiency without wasting space.

According to one aspect of the present disclosure, a light source apparatus includes a plurality of light emitting apparatuses. Each of the light emitting apparatuses includes a substrate, a plurality of light emitting devices arranged on the substrate, and a plurality of lenses. Each of the light emitting apparatuses has a light emitting area and a non-light emitting area on an emission surface thereof that emits light. At least two light emitting apparatuses of the plurality of light emitting apparatuses constitute a light emitting apparatus group disposed such that the emission surfaces of the respective light emitting apparatuses are parallel to each other with a predetermined distance, and that a distance between light emitting areas of the respective light emitting apparatuses when viewed along an optical axis of the light source apparatus is shorter than a distance between the light emitting areas of the respective light emitting apparatuses when the emission surfaces of the respective light emitting apparatuses are on the same plane.

According to one aspect of the present disclosure, light from a plurality of light emitting apparatuses can be combined with high efficiency without wasting space.

DETAILED DESCRIPTION OF EMBODIMENTS

Embodiments will be described in detail below with reference to the drawings as appropriate. However, there is a case where description detailed more than necessary is omitted. For example, there is a case where detailed description of a well-known item or duplicate description of substantially the same configuration is omitted. This is to prevent the following description from being unnecessarily redundant and to facilitate understanding by a person skilled in the art.

It should be noted that the accompanying drawings and the following description are provided for those skilled in the art to fully understand the present disclosure, and are not intended to limit the subject matter described in the claims.

First Embodiment

[1-1. Overall Configuration]

Figure 1:
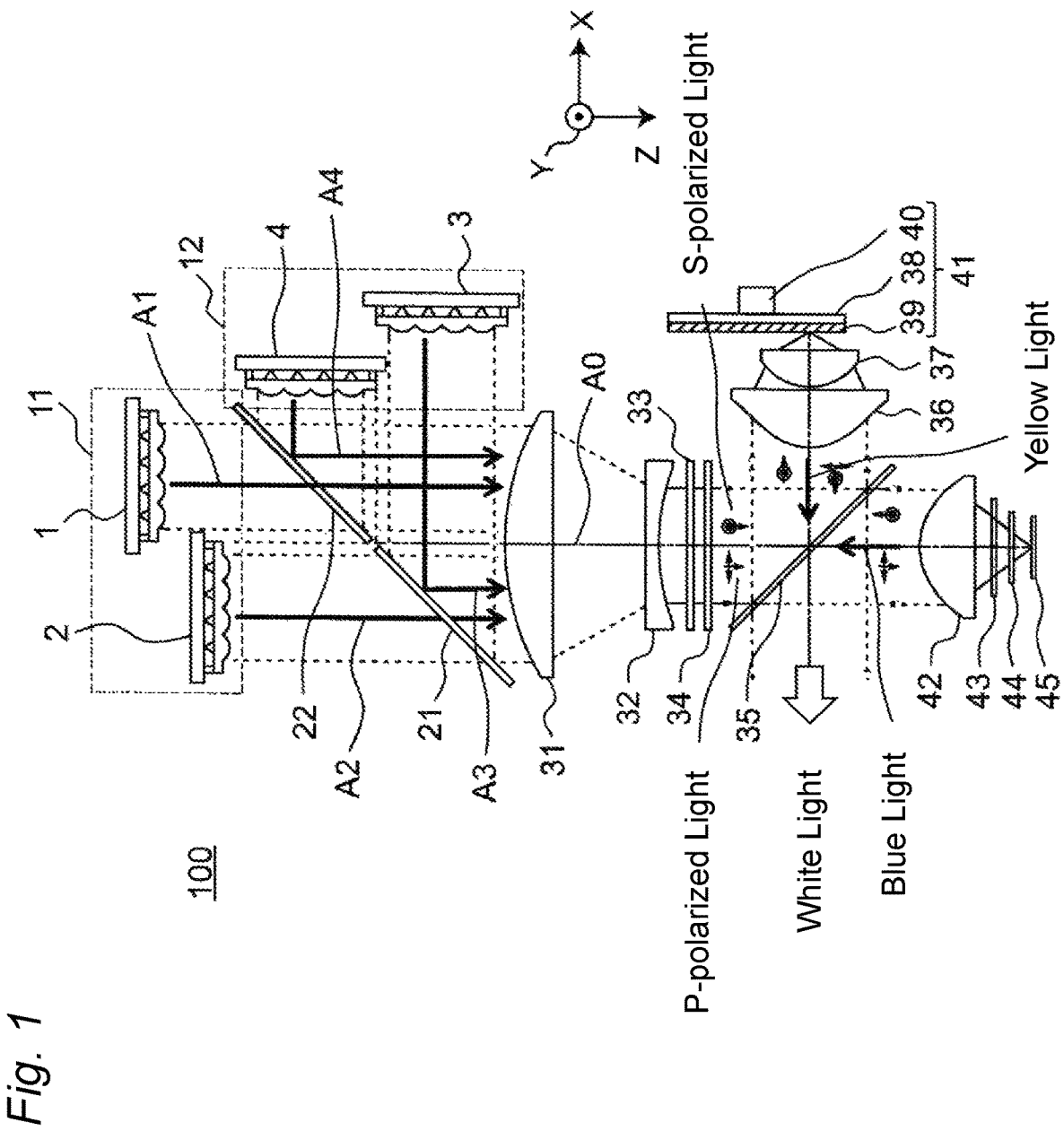
FIG. 1 is a schematic diagram illustrating a configuration of a light source apparatus 100 according to a first embodiment.

FIG. 1 is a schematic diagram illustrating a configuration of a light source apparatus 100 according to a first embodiment. The light source apparatus 100 includes light emitting apparatus groups 11 and 12, lenses 31 and 32, a first diffusion plate 33, a phase difference plate 34, a dichroic mirror 35, condenser lenses 36 and 37, a phosphor wheel apparatus 41, a condenser lens 42, a second diffusion plate 43, a phase difference plate 44, and a reflection plate 45.

[1-2. Configuration of Light Emitting Apparatus Group]

The light emitting apparatus group 11 includes two light emitting apparatuses, which are light emitting apparatuses 1 and 2. The light emitting apparatus group 12 includes two light emitting apparatuses, which are light emitting apparatuses 3 and 4.

Figure 2:
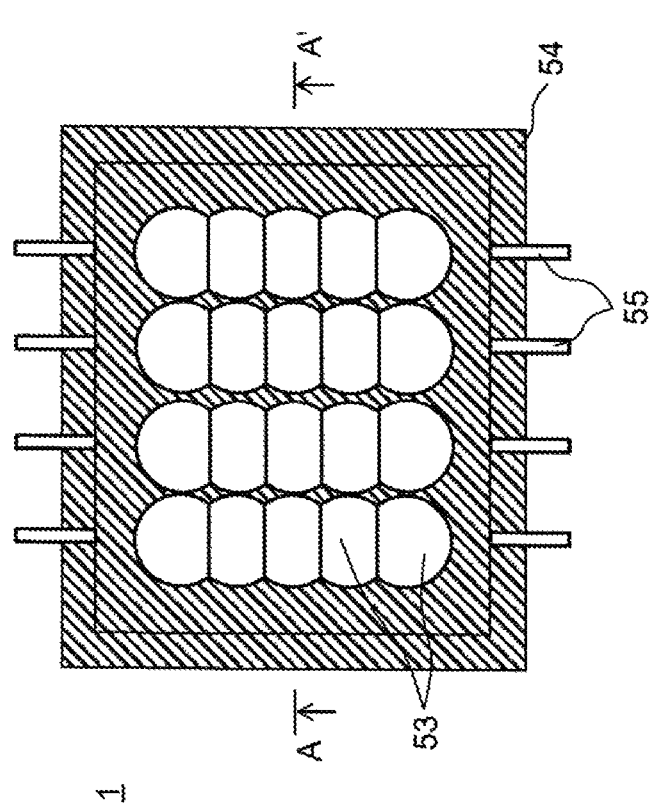
FIG. 2 is a plan view illustrating a configuration of a light emitting apparatus 1 in FIG. 1.
Figure 3:
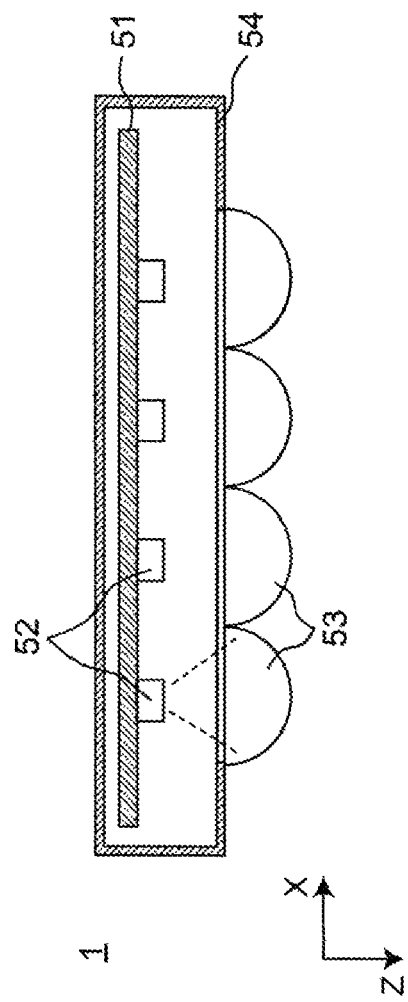
FIG. 3 is a cross-sectional view taken along a line A-A' in FIG. 2.

FIG. 2 is a plan view illustrating the configuration of a light emitting apparatus 1 in FIG. 1. FIG. 3 is a cross-sectional view taken along a line A-A' in FIG. 2. The light emitting apparatus 1 includes a substrate 51, a plurality of light emitting devices 52, a plurality of lenses 53, a casing 54, and an electrode 55. In the light emitting apparatus 1, a surface illustrated in FIG. 2 and a bottom surface in the illustration in FIG. 3 are an emission surface that emits light.

The plurality of light emitting devices (light emitting elements) 52 is arranged on the substrate 51. In an example of the present embodiment, 20 (4×5) light emitting devices 52 are arranged at intersections of orthogonal grids.

Each of the light emitting devices 52 is, for example, a semiconductor laser device that generates blue light having a wavelength of 447 nm to 462 nm.

Each of the lenses 53 is arranged on an emission surface of the casing 54 so as to be positioned above (lower side in FIG. 3) a corresponding light emitting device 52. Each of the lenses 53 is a collimator lens that converts light generated by a corresponding light emitting device 52 into parallel light.

The casing 54 surrounds the substrate 51 and each of the light emitting devices 52.

The electrode 55 is connected to each of the light emitting devices 52 inside the casing 54, and each of the light emitting devices 52 is driven via the electrode 55.

As illustrated in FIG. 2, on an emission surface that emits light, the light emitting apparatus 1 has a light emitting area (that is, an area on which the lenses 53 are arranged) and a non-light emitting area (that is, a hatched area of the casing 54). The light emitting area is an area in which light is substantially emitted from the emission surface, and is an area on which the lenses 53 are arranged. The non-light emitting area is an area on which light is not substantially emitted from the emission surface, and is an area on which the lenses 53 are not arranged. On an emission surface of the light emitting apparatus 1, the non-light emitting area is disposed adjacent to an outer periphery of the light emitting area. In the examples in FIGS. 2 and 3, the non-light emitting area is disposed so as to surround an entire outer periphery of the light emitting area, for example. Both the light emitting area and the non-light emitting area are substantially rectangular areas, and an outer edge of the emission surface of the light emitting apparatus 1 is defined by, for example, the non-light emitting area.

Other light emitting apparatuses 2 to 4 are also configured in a similar manner to the light emitting apparatus 1.

In the example in FIG. 1, the light emitting apparatuses 1 and 2 generate light linearly polarized along a YZ plane with a Z direction as a light emitting direction, and the light emitting apparatuses 3 and 4 generate light linearly polarized along an XY plane with an X direction as a light emitting direction. In the example in FIG. 1, the light emitting apparatuses 1 to 4 are disposed such that light emitted from the light emitting apparatuses 3 and 4 is orthogonal to light emitted from the light emitting apparatuses 1 and 2. The light generated by the light emitting apparatuses 3 and 4 is reflected by mirrors 21 and 22, respectively, by which the light is parallel to the light emitted from the light emitting apparatuses 1 and 2. In FIG. 1, the X direction and a Y direction are directions orthogonal to each other, and the Z direction is a direction orthogonal to the X direction and the Y direction.

In the example in FIG. 2, the non-light emitting area occupies 60% of the emission surface of the light emitting apparatus 1, and the light emitting area occupies 40% of the emission surface of the light emitting apparatus 1. The non-light emitting area has an area about 1.5 times an area of the light emitting area. As described above, in a case where a plurality of light emitting apparatuses is arranged to constitute a high-luminance light source apparatus, a size of the light source apparatus increases due to an increase in a size of total light fluxes by an excess amount of the non-light emitting area. Therefore, the present embodiment describes a configuration of the light source apparatus 100 to combine light from the plurality of light emitting apparatuses 1 to 4 with high efficiency without wasting space.

Figure 4:
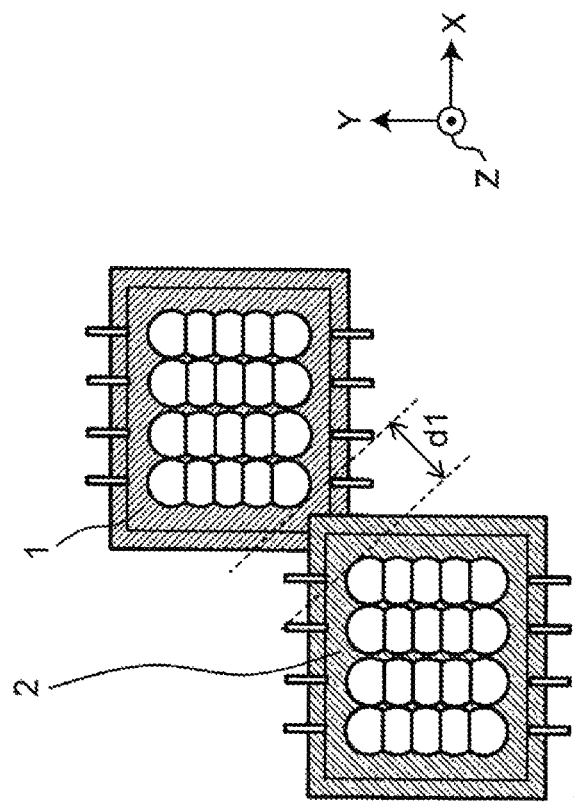
FIG. 4 is a diagram illustrating disposition of light emitting apparatuses 1 and 2 in FIG. 1.

FIG. 4 is a diagram illustrating disposition of light emitting apparatuses 1 and 2 in FIG. 1. FIG. 4 illustrates a case where respective sides of the light emitting apparatuses 1 and 2 are parallel to each other, and the light emitting apparatus 2 is positioned on an extension of a diagonal line of the light emitting apparatus 1. The light emitting apparatuses 1 and 2 are disposed so that the emission surface of the light emitting apparatus 1 and an emission surface of the light emitting apparatus 2 are parallel to each other with a predetermined distance. That is, the emission surface of the light emitting apparatus 1 and the emission surface of the light emitting apparatus 2 are disposed in parallel to each other while being spaced apart from each other in a direction perpendicular to the emission surfaces (that is, the Z direction in FIG. 1). The light emitting apparatuses 1 and 2 are disposed such that a distance d1 between the light emitting areas of the respective light emitting apparatuses 1 and 2 when viewed along a light emitting direction of the light emitting apparatuses 1 and 2 (that is, a direction perpendicular to the emission surfaces of the light emitting apparatuses 1 and 2 (Z direction in FIG. 1)) is shorter than a distance between the light emitting areas of the light emitting apparatuses 1 and 2 when the emission surfaces of the respective light emitting apparatuses 1 and 2 are on the same plane. Further, each of the light emitting apparatuses 1 and 2 may be disposed such that a distance d1 between the light emitting areas of the respective light emitting apparatuses 1 and 2 is minimized when viewed along a light emitting direction of each of the light emitting apparatuses 1 and 2, without either of the light emitting apparatuses covering the light emitting area of another of the light emitting apparatuses. By disposing the light emitting apparatuses 1 and 2 in this way, at least portions of non-light emitting areas of the respective light emitting apparatuses 1 and 2 can be overlapped each other when viewed along a light emitting direction of each of the light emitting apparatuses 1 and 2. Thus, wasting space caused by a non-light emitting area is reduced to bring the light emitting areas close to each other, by which light fluxes from the light emitting apparatuses 1 and 2 can be brought close to each other. Accordingly, a size of total light fluxes emitted from the light emitting apparatus group 11 can be reduced, and a size of the light source apparatus 100 can be reduced.

Figure 5:
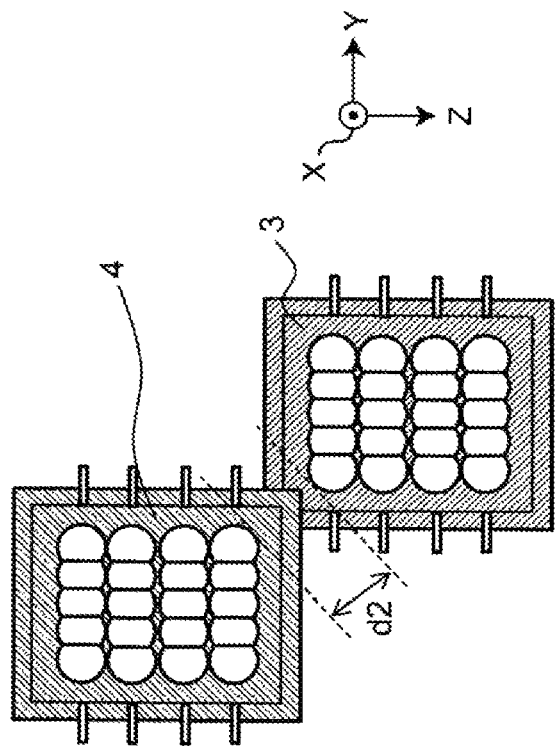
FIG. 5 is a diagram illustrating disposition of light emitting apparatuses 3 and 4 in FIG. 1.

FIG. 5 is a diagram illustrating disposition of light emitting apparatuses 3 and 4 in FIG. 1. FIG. 5 illustrates a case where respective sides of the light emitting apparatuses 3 and 4 are parallel to each other, and the light emitting apparatus 4 is positioned on an extension of a diagonal line of the light emitting apparatus 3. The light emitting apparatuses 3 and 4 are disposed so that an emission surface of the light emitting apparatus 3 and an emission surface of the light emitting apparatus 4 are parallel to each other with a predetermined distance. That is, the emission surface of the light emitting apparatus 3 and the emission surface of the light emitting apparatus 4 are disposed in parallel to each other while being spaced apart from each other in a direction perpendicular to the emission surfaces (that is, the X direction in FIG. 1). The light emitting apparatuses 3 and 4 are disposed such that a distance d2 between the light emitting areas of the respective light emitting apparatuses 3 and 4 when viewed along a light emitting direction of the light emitting apparatuses 3 and 4 (that is, a direction perpendicular to the emission surfaces of the light emitting apparatuses 3 and 4 (X direction in FIG. 1)) is shorter than a distance between the light emitting areas of the light emitting apparatuses 3 and 4 when the emission surfaces of the respective light emitting apparatuses 3 and 4 are on the same plane. Further, each of the light emitting apparatuses 3 and 4 may be disposed such that a distance d2 between the light emitting areas of the respective light emitting apparatuses 3 and 4 is minimized when viewed along a light emitting direction of each of the light emitting apparatuses 3 and 4, without either of the light emitting apparatuses covering the light emitting area of another of the light emitting apparatuses. By disposing the light emitting apparatuses 3 and 4 in this way, at least portions of non-light emitting areas of the respective light emitting apparatuses 3 and 4 can be overlapped each other when viewed along a light emitting direction of each of the light emitting apparatuses 3 and 4. Thus, wasting space caused by a non-light emitting area is reduced to bring the light emitting areas close to each other, by which light fluxes from the light emitting apparatuses 3 and 4 can be brought close to each other. Accordingly, a size of total light fluxes emitted from the light emitting apparatus group 12 can be reduced, and a size of the light source apparatus 100 can be reduced.

Further, in the example in FIG. 1, the light emitting directions of the light emitting apparatuses 1 and 2 are orthogonal to the light emitting directions of the light emitting apparatuses 3 and 4. That is, the light emitting apparatuses 1 to 4 are disposed such that light fluxes A3 and A4 emitted from the light emitting apparatuses 3 and 4 are orthogonal to light fluxes A1 and A2 emitted from the light emitting apparatuses 1 and 2.

Figure 6:
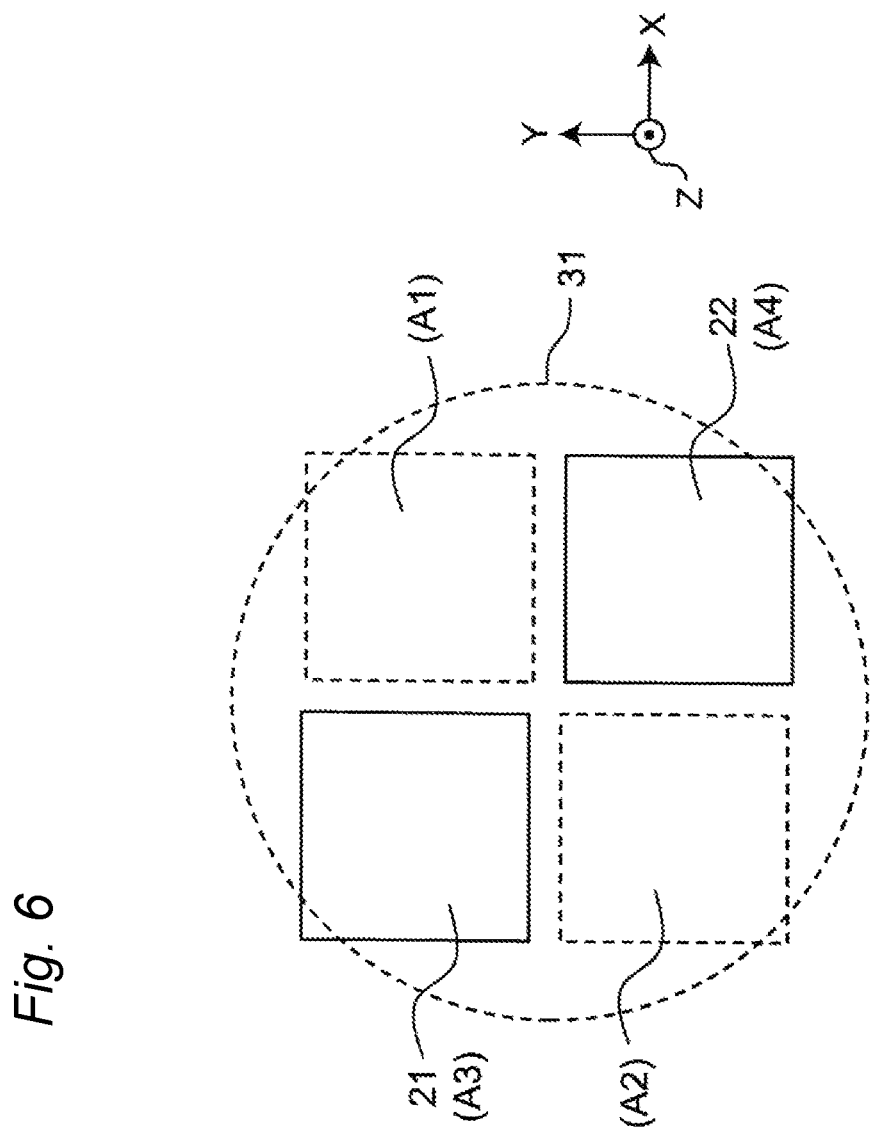
FIG. 6 is a diagram illustrating disposition of light fluxes generated by the light emitting apparatuses 1 to 4 in FIG. 1.

FIG. 6 is a diagram illustrating disposition of light fluxes generated by the light emitting apparatuses 1 to 4 in FIG. 1. Assuming that a center of the lens 31 in the light source apparatus 100 is an optical axis A0 (refer to FIG. 1), examined are areas in a first quadrant to a fourth quadrant on a plane perpendicular to the optical axis A0 of the light source apparatus 100 with the optical axis A0 as a reference (origin). The light emitting apparatuses 1 and 2 are disposed so as to generate the light fluxes A1 and A2 included in the first quadrant and a third quadrant, respectively, on a plane perpendicular to the optical axis A0 of the light source apparatus 100. The light emitting apparatus 3 and the mirror 21 are disposed so as to generate, by the mirror 21 reflecting light emitted from the emission surface of the light emitting apparatus 3, the light flux A3 included in a second quadrant on a plane perpendicular to the optical axis A0 of the light source apparatus 100. The light emitting apparatus 4 and the mirror 22 are disposed so as to generate, by the mirror 22 reflecting light emitted from the emission surface of the light emitting apparatus 4, the light flux A4 included in the fourth quadrant on a plane perpendicular to the optical axis A0 of the light source apparatus 100. By disposing the light emitting apparatuses 1 to 4 and the mirrors 21 and 22 in this way, wasting space caused by the non-light emitting area is reduced to bring the light emitting areas close to each other, by which light fluxes from the light emitting apparatuses 1 to 4 can be brought close to each other. Accordingly, a size of total light fluxes emitted from the light emitting apparatus groups 11 and 12 can be reduced, and a size of the light source apparatus 100 can be reduced.

The light generated by the light emitting apparatuses 3 and 4 is reflected by the mirrors 21 and 22, respectively, by which the light is linearly polarized along the YZ plane. Therefore, the light generated by the light emitting apparatuses 1 and 2 and the light generated by the light emitting apparatuses 3 and 4 and reflected by the mirrors 21 and 22, respectively, have S-polarized light with respect to a surface of the dichroic mirror 35 in a rear stage.

In the first embodiment, the light emitting apparatus 1 is also referred to as a "first light emitting apparatus", the light emitting apparatus 2 is also referred to as a "second light emitting apparatus", the light emitting apparatus 3 is also referred to as a "third light emitting apparatus", and the light emitting apparatus 4 is also referred to as a "fourth light emitting apparatus". In the first embodiment, the light emitting apparatus group 11 is also referred to as a "first light emitting apparatus group", and the light emitting apparatus group 12 is also referred to as a "second light emitting apparatus group". In the first embodiment, the mirror 21 is also referred to as a "first mirror", and the mirror 22 is also referred to as a "second mirror".

[1-3. Configuration of Other Optical Devices, and the Like]

With reference to FIG. 1 again, light fluxes emitted from the light emitting apparatus groups 11 and 12 and combined by the mirrors 21 and 22 are converted into a light flux having a smaller diameter by the lens 31 having a convex surface and the lens 32 having a concave surface, and then is incident on the first diffusion plate 33.

The first diffusion plate 33 includes glass and has a fine concave-convex shape or a microlens-shape on a surface thereof to diffuse incident light. The first diffusion plate 33 has a sufficiently small diffusion angle (that is, a half-value angle width indicating an angular width of light having half intensity of a maximum intensity of diffused light as a reference), which is, for example, a diffusion angle of approximately 3 degrees, so that the emission light maintains a polarization characteristic of the incident light. Emission light from the first diffusion plate 33 is incident on a phase difference plate 34.

The phase difference plate 34 is a phase difference plate that generates a phase difference of a quarter wavelength near a center emission wavelength of each of the light emitting devices 52. The phase difference plate 34 has a fine periodic structure smaller than a wavelength of light, and generates a phase difference by utilizing birefringence generated in the fine periodic structure. The phase difference plate 34 having a fine periodic structure includes, for example, an inorganic material, has excellent durability and reliability as similar to durability and reliability of inorganic optical crystal such as quartz, and is relatively inexpensive. Adjustment of an angle of an optical axis of the phase difference plate 34 allows for adjustment of a ratio of an S-polarized light component and a P-polarized light component with respect to the surface of the dichroic mirror 35 in the rear stage. The optical axis of the phase difference plate 34 is disposed so as to have an angle of 71.5 degrees with respect to an X axis in FIG. 1, for example, and at this time, S-polarized incident light is converted into light including an 82% S-polarized light component and an 18%

P-polarized light component. Emission light from the phase difference plate 34 is incident on the dichroic mirror 35.

The dichroic mirror 35 has a characteristic of, when blue light with a wavelength of 447 nm to 462 nm is incident on the dichroic mirror 35, transmitting P-polarized light of the blue light at a high transmittance, and reflecting S-polarized light of the blue light at a high reflectance of 96% or more. The dichroic mirror 35 has a characteristic of, when green light and red light is incident on the dichroic mirror 35, transmitting P-polarized light and S-polarized light of the respective green light and red light at a high transmittance of 96% or more.

S-polarized blue light, which is incident on the dichroic mirror 35 from the phase difference plate 34 and is reflected on the dichroic mirror 35, is condensed by the condenser lenses 36 and 37 and incident on the phosphor wheel apparatus 41. Provided that a diameter of an area having light intensity of 13.5% with respect to a maximum value of the light intensity is defined to be a spot diameter, incident light to the phosphor wheel apparatus 41 is incident on an area having a spot diameter of 1.5 mm to 2.5 mm. The diffusion plate 33 diffuses the light so that the spot diameter of the incident light to the phosphor wheel apparatus 41 is at a desired value.

The phosphor wheel apparatus 41 includes a circular substrate 38, a phosphor layer 39, and a motor 40. The circular substrate 38 includes, for example, aluminum. On the circular substrate 38, there is formed metal film that reflects visible light or reflective film that is dielectric film. On the reflective film, there is formed the phosphor layer 39 in an annular shape. On the phosphor layer 39, there is formed a Ce-activated YAG yellow phosphor that is excited by blue light to emit yellow light including color component light of each of the green light and the red light, for example. A typical chemical composition of a crystal matrix of the phosphor is, for example, $Y_3Al_5O_{12}$. By being excited by blue light incident from the dichroic mirror 35, the phosphor layer 39 generates yellow light including color component light of each of the green light and the red light. The motor 40 rotates the circular substrate 38. By the circular substrate 38 rotating, a position of the blue light from the dichroic mirror 35 incident on the phosphor layer 39 is moves. Thus, an increase in temperature of the phosphor layer 39 due to being excited by the blue light can be suppressed, and a stable fluorescence conversion efficiency can be maintained. A portion of the light generated by the phosphor layer 39 travels in a −X direction, and another portion of the light travels in a +X direction and is reflected in the −X direction by a reflection layer.

The yellow light emitted from the phosphor wheel apparatus 41 becomes natural light, is again condensed by the condenser lenses 37 and 36, is converted into substantially parallel light, and then is transmitted through the dichroic mirror 35.

Meanwhile, P-polarized blue light incident on the dichroic mirror 35 from the phase difference plate 34 and is transmitted through the dichroic mirror 35 is incident on the condenser lens 42 and condensed. A focal length of the condenser lens 42 is set to form a condensing spot near the reflection plate 45, for example, to have a converging angle of 40 degrees or smaller. Emission light from the condenser lens 42 is incident on the second diffusion plate 43.

The second diffusion plate 43 includes glass and has a fine concave-convex shape or a microlens-shaped on a surface thereof to diffuse incident light. The second diffusion plate 43 diffuses the incident light to uniform light intensity distribution and reduces speckles in laser light. The second diffusion plate 43 has a sufficiently small diffusion angle, which is, for example, a diffusion angle of approximately 4 degrees, so that the emission light maintains a polarization characteristic of the incident light. Emission light from the second diffusion plate 43 is incident on a phase difference plate 44.

The phase difference plate 44 is a phase difference plate that generates a phase difference of a quarter wavelength near a center emission wavelength of each of the light emitting devices 52. The phase difference plate 44 has a fine periodic structure smaller than a wavelength of light, and generates a phase difference by utilizing birefringence generated in the fine periodic structure. The optical axis of the phase difference plate 44 is disposed so as to have an angle of 45 degrees with respect to the X direction in FIG. 1, for example, and at this time, S-polarized incident light is converted into circularly-polarized emission light. The phase difference plate 44 having a fine periodic structure has a very small dependence on an incident angle. Therefore, it is possible to convert linearly polarized incident light into circularly-polarized emission light with high efficiency even if the phase difference plate 44 is disposed at a position on which condensed light or divergent light, not parallel light, is incident. Further, because the phase difference plate 44 is disposed at a position on which condensed light or divergent light is incident, as compared to a case where the phase difference plate 44 is disposed at a position on which parallel light is incident, a size of the phase difference plate 44 can be reduced to half or less, which may lead to cost reduction. Emission light from the phase difference plate 44 is incident on the reflection plate 45.

On the reflection plate 45, there is formed reflective film such as aluminum or dielectric multilayer film. Light incident on the reflection plate 45 from the phase difference plate 44 is reflected by the reflection plate 45, by which a phase of the light is inverted. Accordingly, circularly-polarized incident light becomes reverse-turning circularly-polarized reflected light. By the light incident on the reflection plate 45 from the phase difference plate 44 being reflected by the reflection plate 45, condensed light becomes diffusion light. Reflected light from the reflection plate 45 is again incident on the phase difference plate 44, and is converted from circularly polarized light into S-polarized light by the phase difference plate 44. Highly efficient conversion from P-polarized light into S-polarized light is possible, because there is no member that disturbs polarization disposed between the phase difference plate 44 and the reflection plate 45. Next, the emission light from the phase difference plate 44 is diffused again by the diffusion plate 43, the emission light from the diffusion plate 43 is converted into parallel light by the condenser lens 42, and the emission light from the condenser lens 42 is incident on the dichroic mirror 35. The incident light from the condenser lens 42 to the dichroic mirror 35 has S-polarized light, and therefore, is reflected by the dichroic mirror 35.

The yellow light that is incident on the dichroic mirror 35 from the phosphor wheel apparatus 41 and is transmitted and the blue light that is incident on the dichroic mirror 35 from the reflection plate 45 and is reflected are combined with each other to generate white light. The light source apparatus 100 outputs the combined white light. It is possible to obtain a spectral characteristic having favorable white balance by combining the blue light generated by the semiconductor laser device and the yellow light including color component light of each of the green light and red light generated by exciting the phosphor. With the spectral characteristic, it is possible to obtain monochromatic light of desired chromaticity coordinates even if an optical system of a projection-type image display apparatus separates light into light of the three primary colors, which are blue light, green light, and red light.

The first embodiment has described a case where the light emitting apparatus group 11 includes two light emitting apparatuses, which are light emitting apparatuses 1 and 2, and the light emitting apparatus group 12 includes two light emitting apparatuses, which are light emitting apparatuses 3 and 4. However, each of the light emitting apparatus groups 11 and 12 may include three or more light emitting apparatuses. Further, each of the light emitting apparatus groups 11 and 12 may include one light emitting apparatus.

In the first embodiment, the light emitting apparatuses 1 and 2 of the light emitting apparatus group 11 may be disposed so that the emission surfaces of the respective light emitting apparatuses 1 and 2 are on the same plane. Similarly, the light emitting apparatuses 3 and 4 of the light emitting apparatus group 12 may be disposed so that the emission surfaces of the respective light emitting apparatuses 3 and 4 are on the same plane. In this case, a size of total light fluxes emitted from the light emitting apparatus groups 11 and 12 is slightly larger than a size in the above-described case. However, there is advantage that thickness of each of the light emitting apparatus groups 11 and 12 (that is, a size with respect to a direction along an axis perpendicular to an emission surface of each of the light emitting apparatuses) is reduced.

The first embodiment has described a case where the phase difference plates 34 and 44 have a fine periodic structure. However, the phase difference plates 34 and 44 may be thin film phase difference plates utilizing birefringence by oblique vapor deposition of a dielectric material.

[1-4. Effects and the Like]

According to the first embodiment, the light source apparatus 100 includes a plurality of light emitting apparatuses 1 to 4. Each of the light emitting apparatuses 1 to 4 includes the substrate 51, the plurality of light emitting devices 52 arranged on the substrate 51, and the plurality of lenses 53. Each of the light emitting apparatuses 1 to 4 has, on the emission surface thereof that emits light, a light emitting area and a non-light emitting area. At least two light emitting apparatuses 1 to 4 of the plurality of light emitting apparatuses 1 to 4 constitute light emitting apparatus groups 11 and 12 disposed such that the emission surfaces of the respective light emitting apparatuses 1 to 4 are parallel to each other with a predetermined distance, and that a distance between light emitting areas of the respective light emitting apparatuses 1 to 4 of the respective light emitting apparatuses 1 to 4 when viewed along a light emitting direction of at least the two of the plurality of light emitting apparatuses 1 to 4 is shorter than a distance between the light emitting areas of the light emitting apparatuses 1 to 4 when the emission surfaces of the respective light emitting apparatuses 1 to 4 are on the same plane.

Thus, it is possible to combine light from a plurality of light emitting apparatuses with high efficiency without wasting space.

According to the first embodiment, each of the light emitting apparatuses 1 to 4 of the light emitting apparatus groups 11 and 12 may be disposed such that a distance between the light emitting areas of the respective light emitting apparatuses 1 to 4 is minimized when viewed along a light emitting direction of the light emitting apparatuses 1 to 4, without any of the light emitting apparatuses 1 to 4 covering the light emitting area of another of the light emitting apparatuses 1 to 4.

Thus, it is possible to combine light from a plurality of light emitting apparatuses with higher efficiency without wasting space.

According to the first embodiment, the light source apparatus 100 may further include first and second mirrors 21 and 22. The plurality of light emitting apparatuses 1 to 4 may include first to fourth light emitting apparatuses 1 to 4. The first and second light emitting apparatuses 1 to 4 constitute first light emitting apparatus groups 11 and 12. The third and fourth light emitting apparatuses 1 to 4 constitute second light emitting apparatus groups 11 and 12. The first and second light emitting apparatuses 1 and 2 are disposed so as to generate the light fluxes included in the first quadrant and the third quadrant, respectively, on a plane perpendicular to the optical axis of the light source apparatus 100 with the optical axis as a reference. The third and fourth light emitting apparatuses 3 and 4 and the first and second mirrors 21 and 22 are disposed so as to generate, by the first and second mirrors 21 and 22 reflecting light emitted from the emission surface of each of the third and fourth light emitting apparatuses 3 and 4, respectively, light fluxes included in the second quadrant and the fourth quadrant, respectively, on a plane perpendicular to the optical axis of the light source apparatus 100 with the optical axis as a reference.

Thus, it is possible to combine light from four light emitting apparatuses with high efficiency without wasting space.

According to the first embodiment, each of the light emitting devices 52 may be a blue semiconductor laser device.

Thus, the light source apparatus can output blue light, output light including blue light as a color component, or output light having another color excited by blue light.

According to the first embodiment, each of the light emitting apparatuses 1 to 4 may emit linearly polarized light.

Thus, light generated by each of the light emitting apparatuses can be separated and combined by using a dichroic mirror.

According to the first embodiment, the light source apparatus 100 may include the dichroic mirror 35 that light from each of the light emitting apparatuses 1 to 4 is incident on and is configured to separate and combine first color component light and second color component light different from each other, the phosphor wheel apparatus 41 configured to generate fluorescence by being excited by the first color component light, and the phase difference plate 44 configured to convert the second color component light from linearly polarized light into circularly polarized light.

Thus, for example, white light can be output by using a light emitting apparatus that generates blue light.

According to the first embodiment, the phosphor wheel apparatus 41 may be formed on the circular substrate 38 configured to rotate, and may include a phosphor layer 39 formed from a Ce-activated YAG yellow phosphor.

Thus, white light can be output by using a light emitting apparatus that generates blue light.

By disposing light emitting apparatuses and/or mirrors as described above, wasting space caused by a non-light emitting area is reduced to bring the light emitting areas close to each other, by which light fluxes from the light emitting apparatuses can be brought close to each other. Accordingly, a size of total light fluxes emitted from the light emitting apparatus group can be reduced, and a size of the light source apparatus can be reduced. Therefore, it is possible to provide a small and high-luminance light source apparatus.

Second Embodiment

A second embodiment describes a light source apparatus including a light emitting apparatus and a mirror disposed by a method different from the method in the first embodiment.
[2-1. Configuration]

Figure 7:
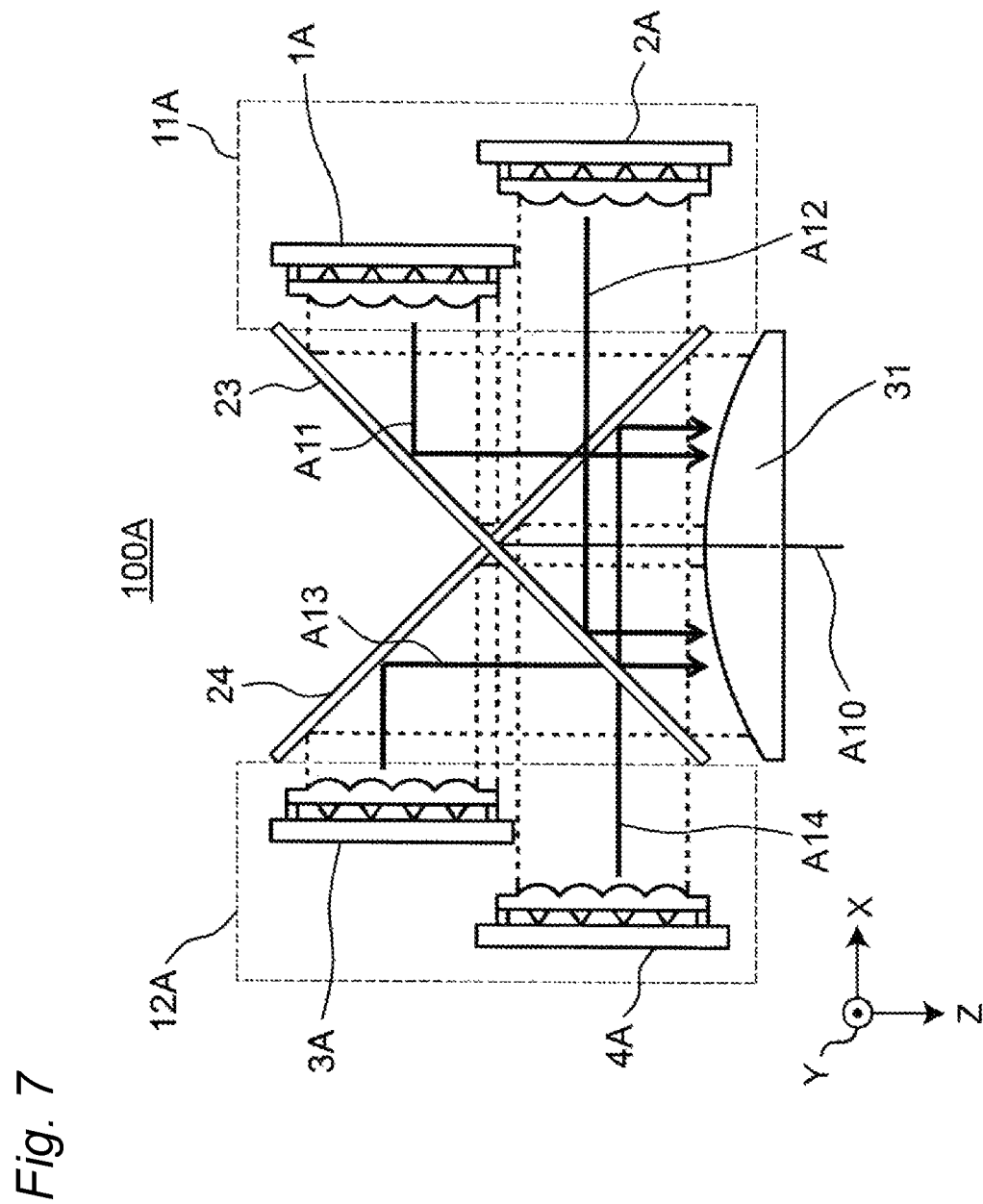
FIG. 7 is a schematic diagram illustrating a configuration of a light source apparatus 100A according to a second embodiment.

FIG. 7 is a schematic diagram illustrating a configuration of a light source apparatus 100A according to the second embodiment. The light source apparatus 100A includes light emitting apparatus groups 11A and 12A, mirrors 23 and 24 in place of the light emitting apparatus groups 11 and 12 and mirrors 21 and 22 in FIG. 1.

The light emitting apparatus group 11A includes two light emitting apparatuses, which are light emitting apparatuses 1A and 2A. The light emitting apparatus group 12A includes two light emitting apparatuses, which are light emitting apparatuses 3A and 4A. Each of the light emitting apparatuses 1A to 4A is also configured in a similar manner to the light emitting apparatus 1 illustrated in FIGS. 2 and 3.

In the first embodiment, the light emitting apparatuses 1 to 4 are disposed such that light fluxes A3 and A4 emitted from the light emitting apparatuses 3 and 4 are orthogonal to light fluxes A1 and A2 emitted from the light emitting apparatuses 1 and 2. Meanwhile, in the second embodiment, emission surfaces of the light emitting apparatuses 3A and 4A are disposed so as to face emission surfaces of the light emitting apparatuses 1A and 2A.

Figure 8:
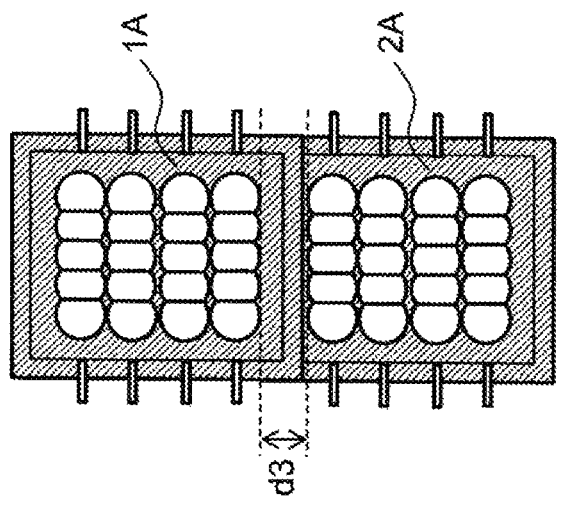
FIG. 8 is a diagram illustrating disposition of light emitting apparatuses 1A and 2A in FIG. 7.

FIG. 8 is a diagram illustrating disposition of light emitting apparatuses 1A and 2A in FIG. 7. FIG. 8 illustrates a case where respective sides of the light emitting apparatuses 1A and 2A are parallel to each other and are aligned in a Z direction. The light emitting apparatuses 1A and 2A are disposed so that the emission surface of the light emitting apparatus 1A and the emission surface of the light emitting apparatus 2A are parallel to each other with a predetermined distance. That is, the emission surface of the light emitting apparatus 1A and the emission surface of the light emitting apparatus 2A are disposed in parallel to each other while being spaced apart from each other in a direction perpendicular to the emission surfaces (X direction). The light emitting apparatuses 1A and 2A are disposed such that a distance d3 between the light emitting areas of the respective light emitting apparatuses 1A and 2A when viewed along a light emitting direction of the light emitting apparatuses 1A and 2A (that is, a direction perpendicular to the emission surfaces of the light emitting apparatuses 1A and 2A (X direction)) is shorter than a distance between the light emitting areas of the light emitting apparatuses 1A and 2A when the emission surfaces of the respective light emitting apparatuses 1A and 2A are on the same plane. Further, each of the light emitting apparatuses 1A and 2A may be disposed such that a distance d3 between the light emitting areas of the respective light emitting apparatuses 1A and 2A is minimized when viewed along a light emitting direction of each of the light emitting apparatuses 1A and 2A, without either of the light emitting apparatuses covering the light emitting area of another of the light emitting apparatuses. By disposing the light emitting apparatuses 1A and 2A in this way, at least portions of non-light emitting areas of the respective light emitting apparatuses 1A and 2A can be overlapped each other when viewed along a light emitting direction of each of the light emitting apparatuses 1A and 2A. Thus, wasting space caused by a non-light emitting area is reduced to bring the light emitting areas close to each other, by which light fluxes from the light emitting apparatuses 1A and 2A can be brought close to each other. Accordingly, a size of total light fluxes emitted from the light emitting apparatus group 11A can be reduced, and a size of the light source apparatus 100A can be reduced.

Figure 9:
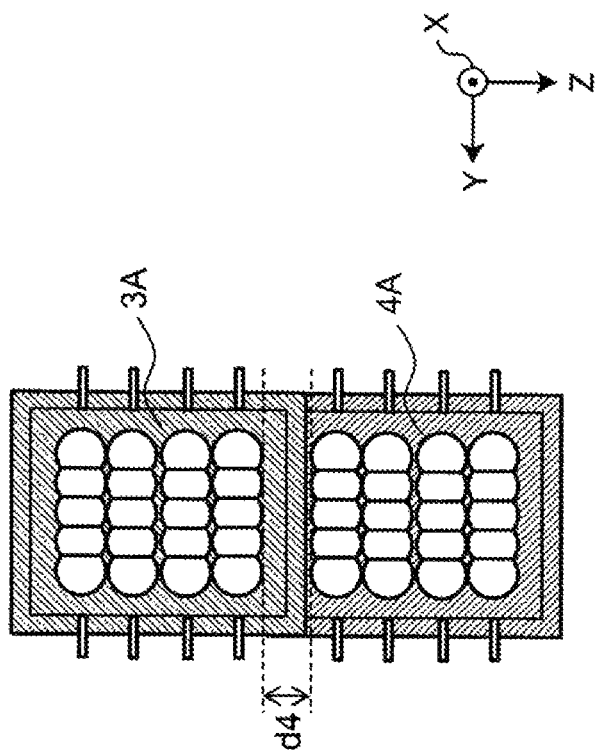
FIG. 9 is a diagram illustrating disposition of light emitting apparatuses 3A and 4A in FIG. 7.

FIG. 9 is a diagram illustrating disposition of light emitting apparatuses 3A and 4A in FIG. 7. FIG. 9 illustrates a case where respective sides of the light emitting apparatuses 3A and 4A are parallel to each other and are aligned in the Z direction. The light emitting apparatuses 3A and 4A are disposed so that the emission surface of the light emitting apparatus 3A and the emission surface of the light emitting apparatus 4A are parallel to each other with a predetermined distance. That is, the emission surface of the light emitting apparatus 3A and the emission surface of the light emitting apparatus 4A are disposed in parallel to each other while being spaced apart from each other in a direction perpendicular to the emission surfaces (X direction). The light emitting apparatuses 3A and 4A are disposed such that a distance d4 between the light emitting areas of the respective light emitting apparatuses 3A and 4A when viewed along a light emitting direction of the light emitting apparatuses 3A and 4A (that is, a direction perpendicular to the emission surfaces of the light emitting apparatuses 3A and 4A (X direction)) is shorter than a distance d4 between the light emitting areas when the emission surfaces of the respective light emitting apparatuses 3A and 4A are on the same plane. Further, each of the light emitting apparatuses 3A and 4A may be disposed such that a distance d4 between the light emitting areas of the respective light emitting apparatuses 3A and 4A is minimized when viewed along a light emitting direction of each of the light emitting apparatuses 3A and 4A, without either of the light emitting apparatuses covering the light emitting area of another of the light emitting apparatuses. By disposing the light emitting apparatuses 3A and 4A in this way, at least portions of non-light emitting areas of the respective light emitting apparatuses 3A and 4A can be overlapped each other when viewed along a light emitting direction of each of the light emitting apparatuses 3A and 4A. Thus, wasting space caused by a non-light emitting area is reduced to bring the light emitting areas close to each other, by which light fluxes from the light emitting apparatuses 3A and 4A can be brought close to each other. Accordingly, a size of total light fluxes emitted from the light emitting apparatus group 12A can be reduced, and a size of the light source apparatus 100A can be reduced.

Figure 10:
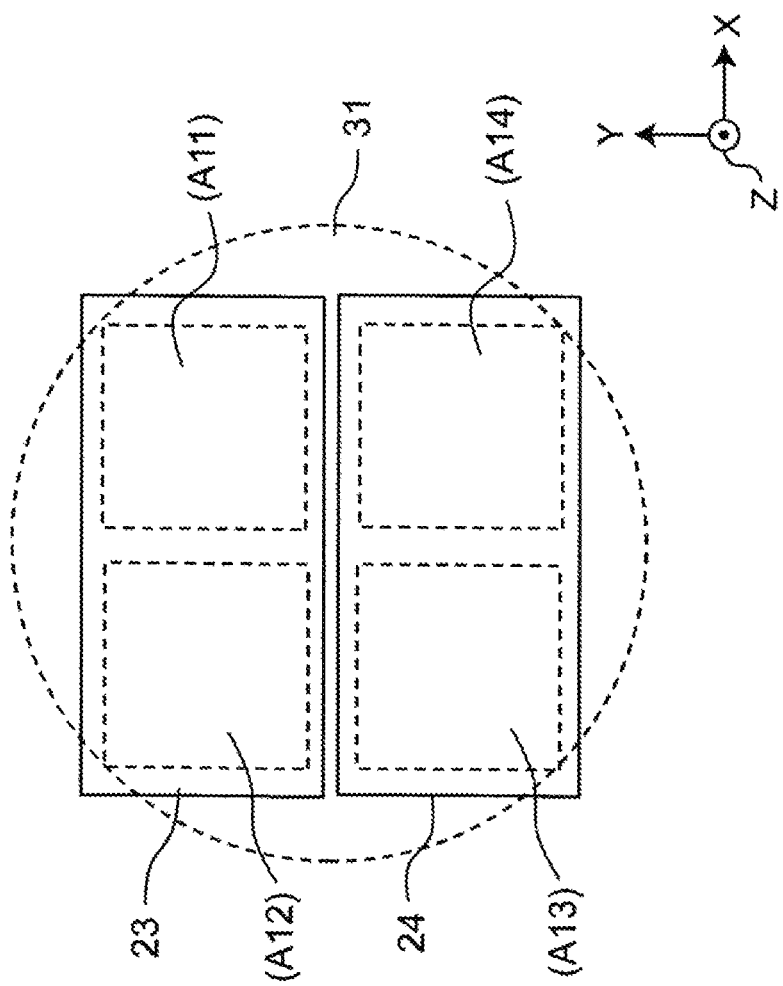
FIG. 10 is a diagram illustrating disposition of light fluxes generated by the light emitting apparatuses 1A to 4A in FIG. 7.

FIG. 10 is a diagram illustrating disposition of light fluxes generated by the light emitting apparatuses 1A to 4A in FIG. 7. Assuming that a center of the lens 31 in the light source apparatus 100A is an optical axis A10 (refer to FIG. 7), examined are areas in a first quadrant to a fourth quadrant on a plane perpendicular to the optical axis A10 of the light source apparatus 100A with the optical axis A10 as a reference (origin). The light emitting apparatuses 1A and 2A and the mirror 23 are disposed on a plane perpendicular to the optical axis A10 of the light source apparatus 100A so as to generate, by the mirror 23 reflecting light emitted from the emission surface of each of the light emitting apparatuses 1A and 2A, light fluxes A11 and A12 included in the first quadrant and the second quadrant. The light emitting apparatuses 3A and 4A and the mirror 24 are disposed on a plane perpendicular to the optical axis A10 of the light source apparatus 100A so as to generate, by the mirror 24 reflecting light emitted from the emission surface of each of the light emitting apparatuses 3A and 4A, light fluxes A13 and A14 included in the third quadrant and the fourth quadrant. By disposing the light emitting apparatuses 1A to 4A and the mirrors 23 and 24 in this way, wasting space caused by a non-light emitting area is reduced to bring the light emitting areas close to each other, by which light fluxes from the light emitting apparatuses 1A to 4A can be brought close to each other. Accordingly, a size of total light fluxes emitted from the light emitting apparatus groups 11A and 12A can be reduced, and a size of the light source apparatus 100A can be reduced.

In the second embodiment, the light emitting apparatus 1A is also referred to as a "first light emitting apparatus", the light emitting apparatus 2A is also referred to as a "second light emitting apparatus", the light emitting apparatus 3A is also referred to as a "third light emitting apparatus", and the light emitting apparatus 4A is also referred to as a "fourth light emitting apparatus". In the second embodiment, the light emitting apparatus group 11A is also referred to as a "first light emitting apparatus group", and the light emitting apparatus group 12A is also referred to as a "second light emitting apparatus group". In the second embodiment, the mirror 23 is also referred to as a "first mirror", and the mirror 24 is also referred to as a "second mirror".

Other components (the lens 31 and components in the rear stage) of the light source apparatus 100A are configured in a similar manner to corresponding components of the light source apparatus 100 in FIG. 1, and are omitted in FIG. 7.

The second embodiment has described a case where the light emitting apparatus group 11A includes two light emitting apparatuses, which are light emitting apparatuses 1A and 3A, and the light emitting apparatus group 12A includes two light emitting apparatuses, which are light emitting apparatuses 2A and 4A. However, each of the light emitting apparatus groups 11A and 12A may include three or more light emitting apparatuses. Further, each of the light emitting apparatus groups 11A and 12A may include one light emitting apparatus.

In the second embodiment, the light emitting apparatuses 1A and 2A of the light emitting apparatus group 11A may be disposed so that the emission surfaces of the respective light emitting apparatuses 1A and 2A are on the same plane. Similarly, the light emitting apparatuses 3A and 4A of the light emitting apparatus group 12A may be disposed so that the emission surfaces of the respective light emitting apparatuses 3A and 4A are on the same plane. In this case, a size of total light fluxes emitted from the light emitting apparatus groups 11A and 12A is slightly larger than a size in the above-described case. However, there is advantage that thickness of each of the light emitting apparatus group 11A and 12A (that is, a size with respect to a direction along an axis perpendicular to the emission surface of each of the light emitting apparatuses) is reduced.

[2-2. Effects and the Like]

According to the second embodiment, the light source apparatus 100A includes a plurality of light emitting apparatuses 1A to 4A. Each of the light emitting apparatuses 1A to 4A includes the substrate 51, the plurality of light emitting devices 52 arranged on the substrate 51, and the plurality of lenses 53. Each of the light emitting apparatuses 1A to 4A has, on the emission surface thereof that emits light, a light emitting area and a non-light emitting area. At least two light emitting apparatuses 1A to 4A of the plurality of light emitting apparatuses 1A to 4A constitute light emitting apparatus groups 11A and 12A disposed such that the emission surfaces of the respective light emitting apparatuses 1A to 4A are parallel to each other with a predetermined distance, and that a distance between light emitting areas of the respective light emitting apparatuses 1A to 4A when viewed along a light emitting direction of at least the two of the plurality of light emitting apparatuses 1A to 4A is shorter than a distance between the light emitting areas of the respective light emitting apparatuses 1A to 4A when the emission surfaces of the respective light emitting apparatuses 1A to 4A are on the same plane.

Thus, it is possible to combine light from a plurality of light emitting apparatuses with high efficiency without wasting space.

According to the second embodiment, each of the light emitting apparatuses 1A to 4A of the light emitting apparatus groups 11A and 12A may be disposed such that a distance between the light emitting areas of the respective light emitting apparatuses 1A to 4A is minimized when viewed along a light emitting direction of the light emitting apparatuses 1A to 4A, without any of the light emitting apparatuses 1A to 4A covering the light emitting area of another of the light emitting apparatuses 1A to 4A.

Thus, it is possible to combine light from a plurality of light emitting apparatuses with higher efficiency without wasting space.

According to the second embodiment, the light source apparatus 100A may further include first and second mirrors 23 and 24. The plurality of light emitting apparatuses 1A to 4A may include first to fourth light emitting apparatuses 1A to 4A. The first and second light emitting apparatuses 1A and 2A constitute first light emitting apparatus group 11A. The third and fourth light emitting apparatuses 3A and 4A constitute second light emitting apparatus group 12A. The first and second light emitting apparatuses 1A and 2A and the first mirror 23 are disposed so as to generate, by the first mirror 23 reflecting light emitted from the emission surface of each of the first and second light emitting apparatuses 1A and 2A, light fluxes included in the first quadrant and the second quadrant, respectively, on a plane perpendicular to the optical axis of the light source apparatus 100A with the optical axis as a reference. The third and fourth light emitting apparatuses 3A and 4A and the second mirror 24 are disposed so as to generate, by the second mirror 24 reflecting light emitted from the emission surface of each of the third and fourth light emitting apparatuses 3A and 4A, light fluxes included in the third quadrant and the fourth quadrant, respectively, on a plane perpendicular to the optical axis of the light source apparatus 100A with the optical axis as a reference.

Thus, it is possible to combine light from four light emitting apparatuses with high efficiency without wasting space.

By disposing light emitting apparatuses and/or mirrors as described above, wasting space caused by a non-light emitting area is reduced to bring the light emitting areas close to each other, by which light fluxes from the light emitting apparatuses can be brought close to each other. Accordingly, a size of total light fluxes emitted from the light emitting apparatus group can be reduced, and a size of the light source apparatus can be reduced. Therefore, it is possible to provide a small and high-luminance light source apparatus.

Third Embodiment

A light source apparatus according to the first and second embodiments can be applied to, for example, a projection-type image display apparatus. A third embodiment describes a case of using an active-matrix type transmissive liquid crystal panel as a light modulation device. The active-matrix type transmissive liquid crystal panel has a thin film transistor formed on a pixel area and is configured to operate in a TN mode or in a VA mode.

[3-1. Overall Configuration]

Figure 11:
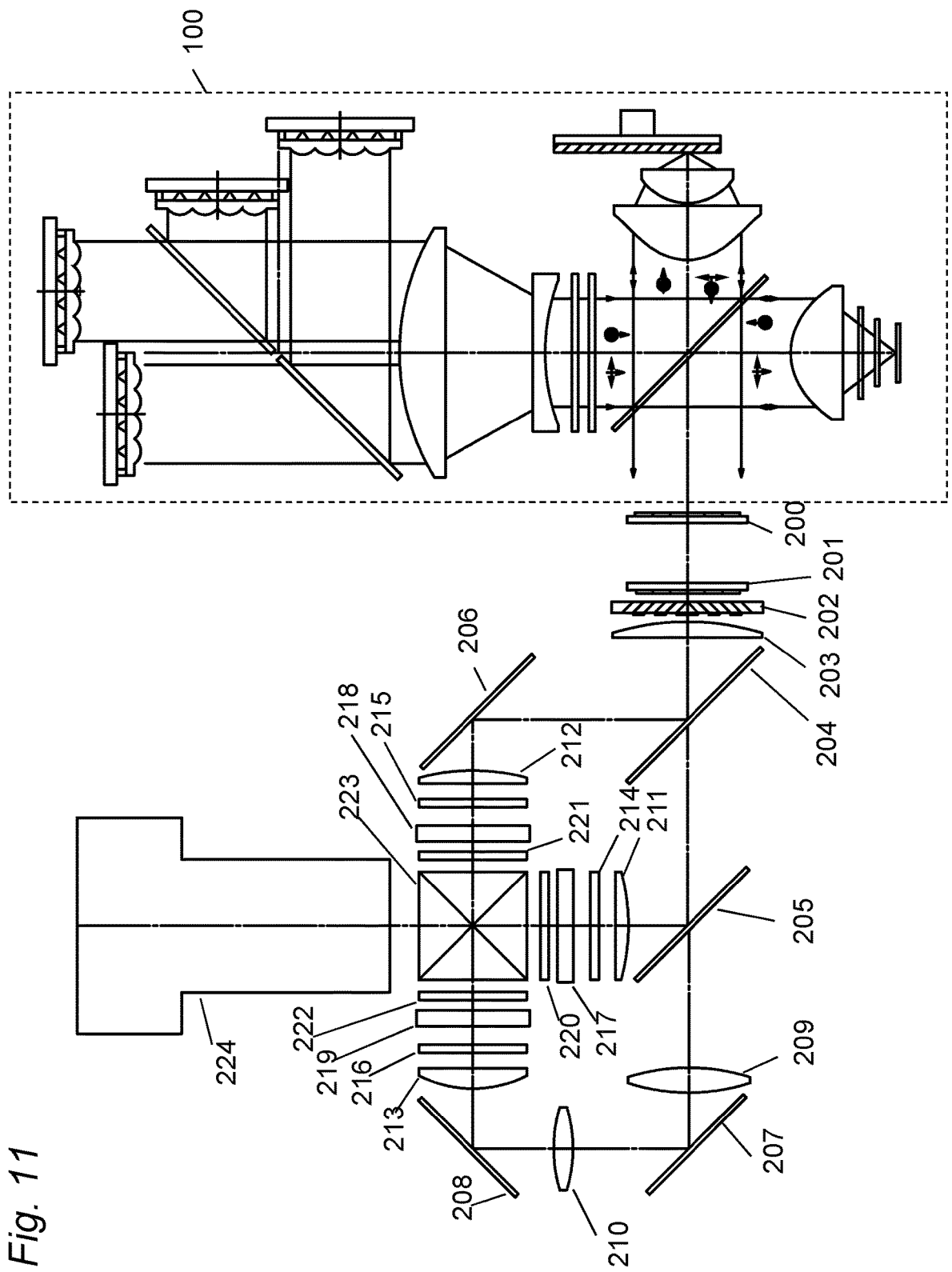
FIG. 11 is a schematic diagram illustrating a configuration of a projection-type image display apparatus according to a third embodiment.

FIG. 11 is a schematic diagram illustrating a configuration of a projection-type image display apparatus according to the third embodiment. The projection-type image display apparatus in FIG. 11 includes a light source apparatus 100, a first illumination lens array plate 200, a second illumination lens array plate 201, a polarization conversion device 202, a superimposing lens 203, a blue-reflecting dichroic mirror 204, a green-reflecting dichroic mirror 205, reflection mirrors 206, 207, and 208, relay lenses 209 and 210, field lenses 211, 212, and 213, incident-side polarization plates 214, 215, and 216, liquid crystal panels 217, 218, and 219, emission-side polarization plates 220, 221, and 222, a color combination prism 223, and a projection optical system 224.

The light source apparatus 100 in FIG. 11 is a light source apparatus 100 according to the first embodiment 1.

White light from the light source apparatus 100 is incident on the first illumination lens array plate 200 including a plurality of lens devices. A light flux incident on the first illumination lens array plate 200 is divided into a large number of light fluxes. The large number of divided light fluxes converges into the second illumination lens array plate 201 including a plurality of lens devices. The lens devices in the first illumination lens array plate 200 have an opening shape similar to the liquid crystal panels 217 to 219. A focal length of each of the lens devices of the second illumination lens array plate 201 is determined so that the first illumination lens array plate 200 and the liquid crystal panels 217 to 219 have a substantially conjugate relation. The light emitted from the second illumination lens array plate 201 is incident on the polarization conversion device 202.

The polarization conversion device 202 includes a polarization separation prism and a half-wave plate, and converts natural light from a light source into light in one polarization direction. Fluorescent light is natural light, and thus the natural light is polarized and converted in one polarization direction. However, blue light is incident with P-polarized light, and thus blue light is converted into S-polarized light. Emission light from the polarization conversion device 202 is incident on the superimposing lens 203.

The superimposing lens 203 is a lens for superimposing light emitted from each of the lens devices of the second illumination lens array plate 201 on the liquid crystal panels 217 to 219.

The first and second illumination lens array plates 200 and 201, the polarization conversion device 202, and the superimposing lens 203 are used as an illumination optical system.

Emission light from the superimposing lens 203 is separated into blue light, green light, and red light by the blue-reflecting dichroic mirror 204 and the green-reflecting dichroic mirror 205, which are color separation units. The green light is transmitted through the field lens 211 and the incident-side polarization plate 214, and then is incident on the liquid crystal panel 217. After being reflected by the reflection mirror 206, the blue light is transmitted through the field lens 212 and the incident-side polarization plate 215, and then is incident on the liquid crystal panel 218. The red light is transmitted, refracted, and reflected by the relay lenses 209 and 210, and the reflection mirrors 207 and 208. Then, the red light is further transmitted through the field lens 213 and the incident-side polarization plate 216 and is incident on the liquid crystal panel 219.

The incident-side polarization plates 214 to 216 and emission-side polarization plates 220 to 222 are disposed on both sides of the liquid crystal panels 217 to 219, respectively, so as to be orthogonal to transmission axes thereof. The liquid crystal panels 217 to 219 change and spatially modulate a polarization state of the incident light by controlling voltage applied to each of pixels thereof according to an image signal, and forms image light of green light, blue light, and red light.

The color combination prism 223 includes a red-reflecting dichroic mirror and a blue-reflecting dichroic mirror. Among image light of each of the colors transmitted through the emission-side polarization plates 220 to 222, the green light is transmitted through the color combination prism 223, the red light is reflected by the red-reflecting dichroic mirror of the color combination prism 223, and the blue light is reflected by the blue-reflecting dichroic mirror of the color combination prism 223. Thus, the transmitted green light is combined with the reflected red light and the blue light, and then is incident on the projection optical system 224. The light incident on the projection optical system 224 is magnified and projected on a screen (not illustrated).

The light source apparatus 100 is formed small including a plurality of light emitting apparatuses 1 to 4 and emits white light having favorable white balance with high efficiency. Therefore, the light source apparatus 100 can implement a small and high-luminance projection-type image display apparatus. In addition, as light modulation devices, the three liquid crystal panels 217 to 219 utilizing polarization, instead of a time division method, are used. Therefore, it is possible to perform favorable color reproduction without color breaking and to obtain a high-definition, bright projected image. In addition, because a total reflection prism is not required and a small color combination prism with an incident angle of 45 degrees is used, it is possible to constitute a smaller projection-type image display apparatus than when using three DMDs as light modulation devices.

The third embodiment has described a case of using a transmissive liquid crystal panel as a light modulation device. However, a reflective liquid crystal panel may be used. By using a reflective liquid crystal panel, it is possible to configure a smaller high-definition projection-type image display apparatus.

The third embodiment has described a case where the light source apparatus 100 according to the first embodiment is used. However, the light source apparatus 100A according to the second embodiment may be used.

[3-2. Effects and the Like]

According to the third embodiment, the projection-type image display apparatus includes the light source apparatus 100 or 100A according to the first or second embodiment, the illumination optical system configured to transmit light from the light source apparatus 100 or 100A, the light modulation device configured to spatially modulate light incident through the illumination optical system according to an image signal, and a projection optical system configured to project light modulated by the light modulation device. The light modulation devices may be liquid crystal panels 217 to 219.

Thus, it is possible to provide a small and high-luminance projection-type image display apparatus.

Fourth Embodiment

A fourth embodiment describes a case of using a digital micromirror device (DMD) as a light modulation device.

[4-1. Overall Configuration]

Figure 12:
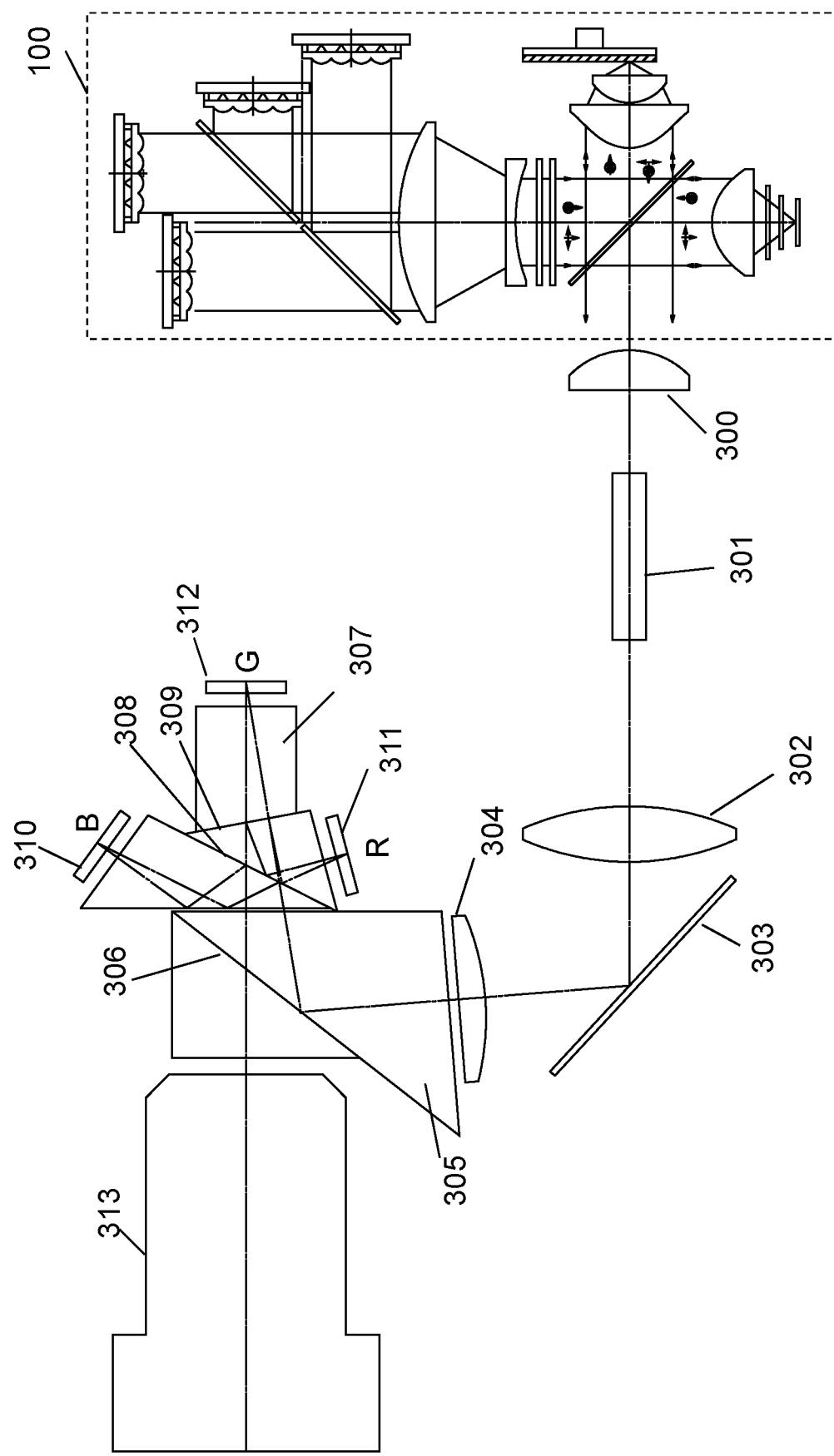
FIG. 12 is a schematic diagram illustrating a configuration of a projection-type image display apparatus according to a fourth embodiment.

FIG. 12 is a schematic diagram illustrating a configuration of a projection-type image display apparatus according to the fourth embodiment. The projection-type image display apparatus in FIG. 12 includes a light source apparatus 100, a condenser lens 300, a rod 301, a relay lens 302, a reflection mirror 303, a field lens 304, a total reflection prism 305, an air layer 306, a color prism 307, a blue-reflecting dichroic mirror 308, a red-reflecting dichroic mirror 309, DMDs 310, 311, 312, and a projection optical system 313.

The light source apparatus 100 in FIG. 12 is a light source apparatus 100 according to the first embodiment 1.

White light emitted from the light source apparatus 100 is incident on the condenser lens 300 and is condensed on the rod 301. By being reflected a plurality of times inside the rod, incident light on the rod 301 is emitted with uniform light intensity distribution. Emission light from the rod 301 is condensed by the relay lens 302, reflected by the reflection mirror 303, transmitted through the field lens 304, and then incident on the total reflection prism 305.

The total reflection prism 305 includes two prisms. The air layer 306 is thin and formed on proximity surfaces of the respective prisms. The air layer 306 totally reflects the light incident at an angle equal to or larger than a critical angle. Emission light from the field lens 304 is reflected by a total reflection surface of the total reflection prism 305 and is incident on the color prism 307.

The color prism 307 includes three prisms. The blue-reflecting dichroic mirror 308 and the red-reflecting dichroic mirror 309 are formed on a proximity surface of each of the prisms. By the blue-reflecting dichroic mirror 308 and the red-reflecting dichroic mirror 309 of the color prism 307, the incident light is separated into blue light, red light, and green light, which are then incident on the DMDs 310 to 312, respectively.

The DMDs 310 to 312 deflect a micromirror according to an image signal and separate the incident light into reflected light directed toward the projection optical system 313 and reflected light traveling outside an effective position of the projection optical system 313. The light reflected by the DMDs 310 to 312 is transmitted through the color prism 307 again.

In a process of being transmitted through the color prism 307, the separated blue light, red light, and green light are combined with one another and incident on the total reflection prism 305. Because light incident on the total reflection prism 305 is incident on the air layer 306 at an angle equal to or smaller than a critical angle, the combined light is transmitted through the total reflection prism 305 and is incident on the projection optical system 313. In this way, image light formed by the DMDs 310 to 312 is magnified and projected on a screen (not illustrated).

The light source apparatus 100 is formed small including a plurality of light emitting apparatuses 1 to 4 and emits white light having favorable white balance with high efficiency. Therefore, the light source apparatus 100 can implement a small and high-luminance projection-type image display apparatus. The DMDs 310 to 312 are used as light modulation devices. Therefore, it is possible to configure a projection-type image display apparatus having higher light resistance and heat resistance than a light modulation device using a liquid crystal panel. Further, because the three DMDs 310 to 312 are used, it is possible to perform favorable color reproduction and to obtain a high-definition, bright projected image.

The fourth embodiment has described a case of using the three DMDs 310 to 312 as light modulation devices. However, one DMD may be used in the configuration. By using one DMD, it is possible to configure a smaller projection-type image display apparatus.

[4-2. Effects and the Like]

According to the fourth embodiment, the projection-type image display apparatus includes the light source apparatus 100 or 100A according to the first or second embodiment, the illumination optical system configured to transmit light from the light source apparatus 100 or 100A, the light modulation device configured to spatially modulate light incident through the illumination optical system according to an image signal, and the projection optical system configured to project light modulated by the light modulation device. The light modulation devices may be digital micromirror devices 310 to 312.

Thus, it is possible to provide a small and high-luminance projection-type image display apparatus.

Other Embodiments

As described above, some embodiments have been described as examples of techniques of the present disclosure. However, the techniques in the present disclosure are not limited to this, and can be applied to an embodiment to which a change, replacement, addition, omission, or the like, has been made. Furthermore, it is also possible to combine each component described in the above embodiment to form a new embodiment.

The light source apparatus according to the present disclosure can be applied to a projection-type image display apparatus using a light modulation device.

What is claimed is:

1. A light source apparatus comprising a plurality of light emitting apparatuses, wherein
each of the light emitting apparatuses includes:
a substrate;
a plurality of light emitting devices arranged on the substrate, and
a plurality of lenses; and
each of the light emitting apparatuses has an emission surface including a light emitting area and non-light emitting area, and
at least two light emitting apparatuses of the plurality of light emitting apparatuses constitute a light emitting apparatus group disposed such that the emission surfaces of the respective light emitting apparatuses are parallel to each other while being spaced apart from each other in a direction perpendicular to the emission surfaces, and such that, when viewed in the direction perpendicular to the emission surfaces, portions of the non-light emitting areas of the respective light emitting apparatuses overlap each other.

2. The light source apparatus according to claim 1, wherein each of the light emitting apparatuses of the light emitting apparatus group is disposed such that a distance between the light emitting area of each of the light emitting apparatuses is minimized when viewed in the direction perpendicular to the emission surfaces, without any of the light emitting apparatuses covering the light emitting area of another of the light emitting apparatuses.

3. The light source apparatus according to claim 1, comprising first and second mirrors, wherein
the plurality of light emitting apparatuses include first and second light emitting apparatuses that constitute a first light emitting apparatus group, and third and fourth light emitting apparatuses that constitute a second light emitting apparatus group,
the first and second light emitting apparatuses are disposed so as to generate light fluxes included in a first quadrant and a third quadrant, respectively, on a plane perpendicular to an optical axis of the light source apparatus, and
the third and fourth light emitting apparatuses and the first and second mirrors are disposed so as to generate light fluxes included in a second quadrant and a fourth quadrant, respectively, on a plane perpendicular to an optical axis of the light source apparatus, by the first and second mirrors reflecting light emitted from an emission surface of each of the third and fourth light emitting apparatuses.

4. The light source apparatus according to claim 1, the light source apparatus further comprising first and second mirrors, wherein the plurality of light emitting apparatuses include first and second light emitting apparatuses that constitute a first light emitting apparatus group, and third and fourth light emitting apparatuses that constitute a second light emitting apparatus group, the first and second light emitting apparatuses and the first mirror are disposed so as to generate light fluxes included in a first quadrant and a second quadrant, respectively, on a plane perpendicular to an optical axis of the light source apparatus, by the first mirror reflecting light emitted from an emission surface of each of the first and second light emitting apparatuses, and the third and fourth light emitting apparatuses and the second mirror are disposed so as to generate light fluxes included in a third quadrant and a fourth quadrant, respectively, on a plane perpendicular to an optical axis of the light source apparatus, by the second mirror reflecting light emitted from an emission surface of each of the third and fourth light emitting apparatuses.

5. The light source apparatus according to claim 1, wherein each of the light emitting devices is a semiconductor laser device configured to generate blue light.

6. The light source apparatus according to claim 1, wherein each of the light emitting apparatuses is configured to emit linearly polarized light.

7. The light source apparatus according to claim 1, comprising:

a dichroic mirror on which light from each of the light emitting apparatuses is incident, the dichroic mirror being configured to separate and combine first color component light and second color component light different from each other;

a phosphor wheel apparatus configured to generate fluorescence by being excited by the first color component light; and a phase difference plate configured to convert the second color component light from linearly polarized light into circularly polarized light.

8. The light source apparatus according to claim 7, wherein the phosphor wheel apparatus is formed on the circular substrate configured to rotate, and includes a phosphor layer formed from a Ce-activated YAG yellow phosphor.

9. A projection-type image display apparatus comprising:

the light source apparatus according to claim 1;

an illumination optical system configured to transmit light from the light source apparatus;

a light modulation device configured to spatially modulate light incident through the illumination optical system according to an image signal; and a projection optical system configured to project light modulated by the light modulation device.

10. The projection-type image display apparatus according to claim 9, wherein the light modulation device is a liquid crystal panel.

11. The projection-type image display apparatus according to claim 9, wherein the light modulation device is a digital micromirror device.

* * * * *